United States Patent
Dietrich

Patent Number: 6,085,634
Date of Patent: Jul. 11, 2000

[54] POWER STEERING CYLINDER ASSEMBLY

[76] Inventor: Otto E. Dietrich, 911 W. Jefferson P.O. Box 121, Morton, Ill. 61550

[21] Appl. No.: 09/003,007

[22] Filed: Jan. 5, 1998

Related U.S. Application Data

[60] Provisional application No. 60/035,439, Jan. 30, 1997.

[51] Int. Cl.[7] .................................................. F15B 13/10
[52] U.S. Cl. .................................................. 91/422; 91/438
[58] Field of Search ............................. 91/437, 438, 422

[56] References Cited

U.S. PATENT DOCUMENTS

| | | | |
|---|---|---|---|
| 2,310,570 | 2/1943 | Briggs | 137/599 |
| 2,778,339 | 1/1957 | Mancusi | 91/438 |
| 4,373,051 | 2/1983 | Darling et al. | 137/493.3 |
| 4,591,177 | 5/1986 | Perlini | 91/437 |
| 4,616,727 | 10/1986 | Kircher et al. | 91/438 |

*Primary Examiner*—F. Daniel Lopez

[57] ABSTRACT

This power steering cylinder assembly consists of a hydraulic cylinder which is closed at each end. A piston rod travels through the center of each end has a piston assembly fastened on it. The cylinder has holes in each end for fluid to enter and move the piston or be discharged from the cylinder. The piston has holes completely through it and a flat ring valve is supported on each side and slides in the piston. These valves are urged away from the piston by spring pressure. When power steering is used these valves close by the fluid pressure to seal the piston. When the fluid pressure drops low enough so manual steering must be used the valves open and the fluid travels through the piston as it is pushed back and forth.

4 Claims, 2 Drawing Sheets

SECTION 1-1

SECTION 1-1

SECTION 2-2

SECTION 3-3

POWER STEERING CYLINDER ASSEMBLY

This application claims the benefit of U.S. Provisional Application No. 60/035,439. Filed on Jan. 30, 1997.

BACKGROUND OF THE INVENTION

This invention relates generally to fluid power assisted steering mechanisms as used in automobiles and like machines, more particularity to freeing or greatly reducing the restrictions imposed by the fluid power system, when manual steering is used.

PRIOR ART

Power steering systems are well known and have been used in autobobiles and other wheeled vehicles for many years very successfully. Generally they consist of a hydraulic pump, driven by the engine, a distribution valve controlled by the steering wheel, a reservoir and in many cases a hydraulic cylinder with a piston fastened to a rod that slides through the cylinder. The ends of the rod are connected to steerable wheels. Most of the steering effort is provided by the hydraulic pressure pushing the piston back and forth. The problem with this system is when the operator is driving the machine and a steering pump belt breaks or for some other reason the hydraulic pressure drops. In cold weather it is almost impossible to manually steer the machine. The purpose of the present invention is to reduce the effort needed to manually push the piston in the cylinder to steer the wheel. The inventor has patent pending on an earlier filed invention Ser. No. 603,133. However, this new invention is a great improvement over the other invention since it has no outside operative mechanism on the cylinder and is much simpler in design.

SUMMARY

This power steering cylinder assembly, which can replace the cylinder in some existing systems, or be used in a new power steering system, is designed to relieve some of the additional load caused by the piston, when manual steering must by used.

DETAILED DESCRIPTION OF THE DRAWINGS

Figure 1:
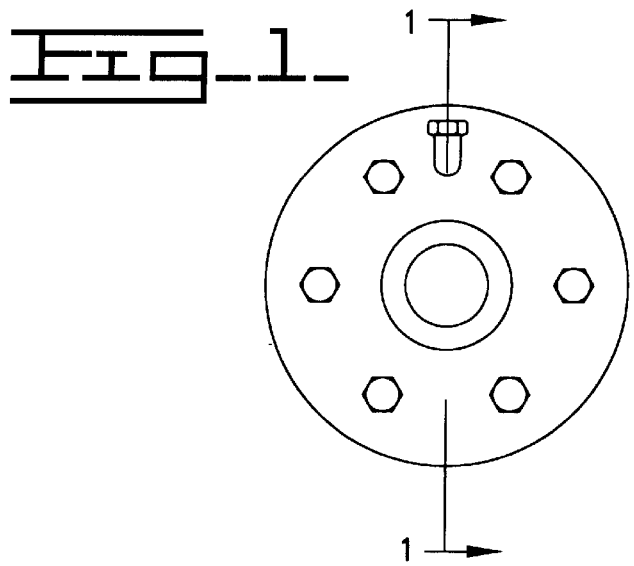
FIG. 1 is an end view of the assembly.
Figure 2:
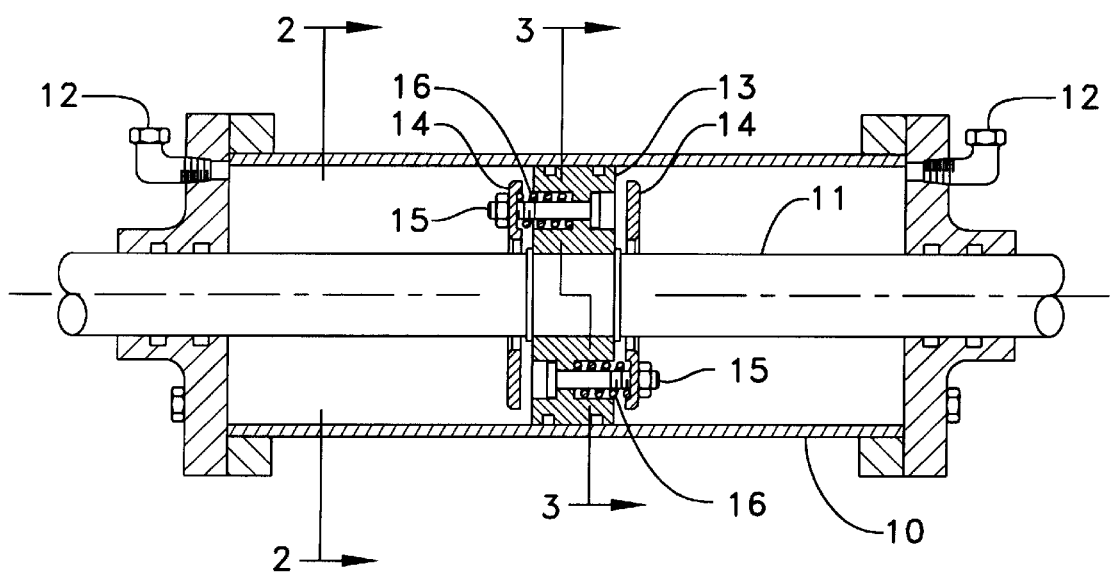
FIG. 2 is a sectional view taken on line 1—1 of FIG. 1
Figure 2:
Figure 3:
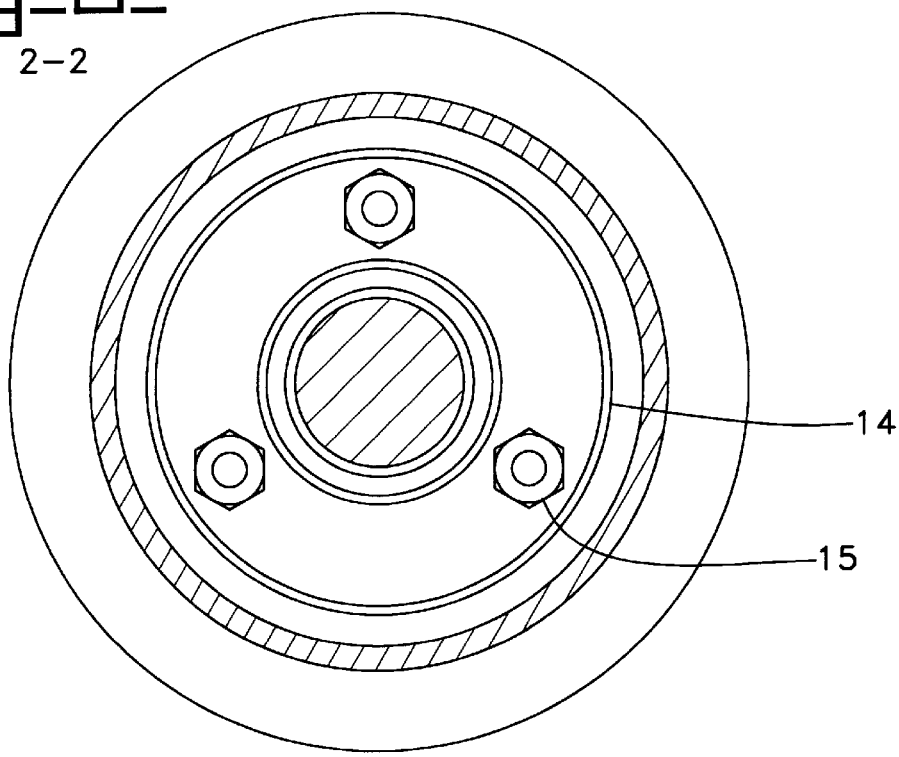
FIG. 3 is a sectional view taken on line 2—2 of FIG. 2
Figure 4:
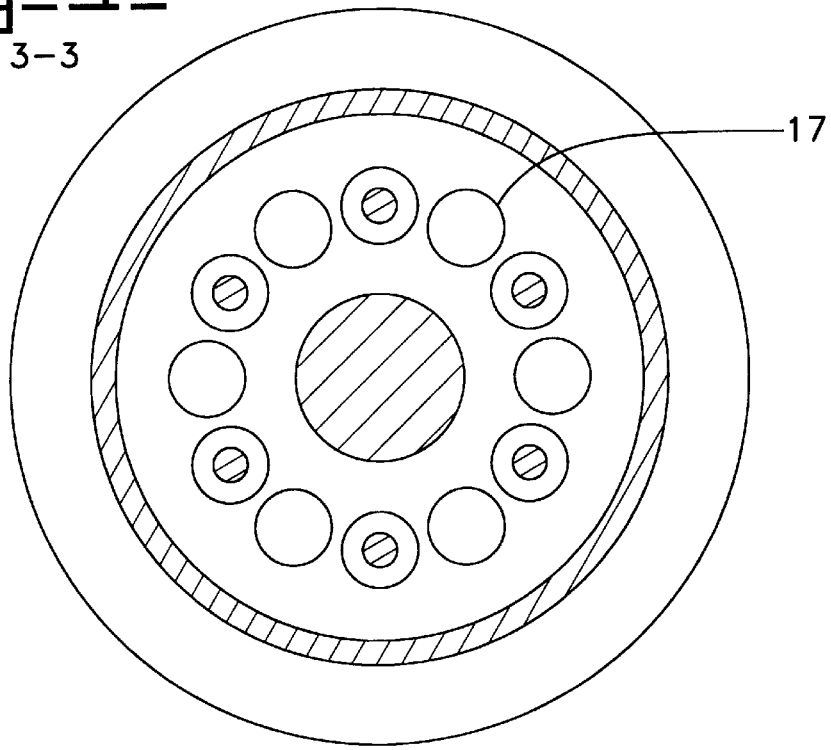
FIG. 4 is a sectional view taken on line 3—3 of FIG. 2

FIG. 1 shows a sectional view of the entire cylinder assembly, represented by the number 10. 11 is the steering and piston rod, with the piston assembly fastened to it. At 12 is the ports in the end of the cylinder, for fluid to enter and be discharged. 14 is the flat ring valves, that slide in the piston. These valves slide in the piston by the bolts 15, which are shown in the cross section of the piston assembly and in FIG. 3, section 2—2. These valves are urged away from the piston by the springs 16. At section 3—3 in FIG. 4, the holes through the piston are shown at 17.

Operation

When the entire system is filled with fluid under pressure and the steering wheel is moved slightly, the distribution valve will cause the fluid pressure in the area on one side of the piston to drop slightly, and the greater pressure on the opposite side of the piston, will force the flat valve to close against the piston, which seals the piston and power steering can be used. When the steering wheel is turned in the opposite direction the valve on that side closes to seal the piston. If the engine stops or a pump belt breaks and the pressure drops below the spring pressure of the valves, these valves will open and the fluid can pass through the piston, as the piston is being pushed back and forth unrestricted by the manual steering.

I claim:

1. A power steering cylinder assembly for automobiles and like wheeled vehicles, consisting of a closed cylinder with a piston rod slidable through the cylinder, the ends of the piston rod connected to steerable wheels, a piston assembly fastened to said rod, a small opening in each end of the cylinder for fluid to enter and move the piston assembly, and for the fluid to be discharged therefrom, said piston assembly having passages through the piston assembly for fluid to flow through, valve means on the piston assembly to open and close these passages, said valve means being a cover plate on each side of the piston assembly, each said cover plate being fixed to bolts slidable in the piston assembly, said cover plates being under constant spring pressure urging them away from the piston.

2. A power steering cylinder assembly, as claimed in claim 1, wherein said cover plate completely seals the passages, when forced against the piston assembly under fluid pressure.

3. A power steering cylinder assembly, as claimed in claim 1, wherein said spring pressure holds each of the cover plates away from the piston assembly, when the fluid pressure against each of the cover plates is at a minimum.

4. A power steering cylinder assembly, as claimed in claim 1, wherein said spring pressure does not hold one of the cover plates away from the piston assembly, when the fluid pressure against the one cover plate is at operating pressure, thereby sealing the passages.

* * * * *